United States Patent
Ashida et al.

(10) Patent No.: US 7,643,888 B2
(45) Date of Patent: Jan. 5, 2010

(54) CONTROL APPARATUS

(75) Inventors: Kazuhide Ashida, Higashimurayama (JP); Akira Nojima, Kunitachi (JP)

(73) Assignees: Kabushiki Kaisha Toshiba, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 223 days.

(21) Appl. No.: 11/236,721

(22) Filed: Sep. 28, 2005

(65) Prior Publication Data

US 2006/0079966 A1    Apr. 13, 2006

(30) Foreign Application Priority Data

Sep. 29, 2004  (JP)  .............................. 2004-284743

(51) Int. Cl.
*G05B 15/00* (2006.01)
*G05B 11/01* (2006.01)

(52) U.S. Cl. ................ 700/1; 700/14; 700/17; 700/20

(58) Field of Classification Search ............. 700/14, 700/17, 20
See application file for complete search history.

(56) References Cited

U.S. PATENT DOCUMENTS

| | | | |
|---|---|---|---|
| 5,485,628 A * | 1/1996 | Clements | 700/14 |
| 6,477,620 B1 * | 11/2002 | Bauman et al. | 711/118 |
| 6,598,108 B1 * | 7/2003 | Ashida et al. | 710/305 |
| 2002/0026248 A1 * | 2/2002 | Kaneko et al. | 700/14 |

FOREIGN PATENT DOCUMENTS

| | | |
|---|---|---|
| JP | 3-141403 | 6/1991 |
| JP | 5-66814 | 3/1993 |
| JP | 2001-100810 | 4/2001 |
| JP | 2001-229136 | 8/2001 |
| JP | 2003-029809 | 1/2003 |
| JP | 2003-122411 | 4/2003 |
| JP | 2004-94473 | 3/2004 |
| JP | 2004-265001 | 9/2004 |

OTHER PUBLICATIONS

Notification of Reasons for Rejection issued by the Japanese Patent Office on Nov. 7, 2006, for Japanese Patent Application No. 2004-284743, and English-language translation thereof.
Final Notice of Rejection issued by the Japanese Patent Office on Feb. 20, for Japanese Patent Application No. 2004-284743, and English-language translation thereof.
Final Notice of Rejection mailed by the Japanese Patent Office on Jun. 5, 2007, for Japanese Patent Application No. 2004-284743, and an English-language translation thereof.

* cited by examiner

*Primary Examiner*—Albert DeCady
*Assistant Examiner*—Thomas H Stevens
(74) *Attorney, Agent, or Firm*—Finnegan, Henderson, Farabow, Garrett & Dunner, L.L.P.

(57) ABSTRACT

A control apparatus which generates control information on the basis of control target information from a control target, controls the control target by using the generated control information, and transmits the control information to an off-system control apparatus, includes a single common memory which stores both the control target information from the control target, and the transmitted control information.

3 Claims, 10 Drawing Sheets

| | Common memory of control apparatus 1 (#1) | | Common memory of control apparatus 1 (#2) | | Common memory of control apparatus 1 (#3) | | Common memory of control apparatus 1 (#n) |
|---|---|---|---|---|---|---|---|
| C1 | Transmission data area of control apparatus 1 (#1) | → | Reception data area from control apparatus 1 (#1) | → | Reception data area from control apparatus 1 (#1) | → | Reception data area from control apparatus 1 (#1) |
| C2 | Reception data area from off-system control apparatus 1 (#2) | ← | Transmission data area of off-system control apparatus 1 (#2) | → | Reception data area from off-system control apparatus 1 (#2) | → | Reception data area from off-system control apparatus 1 (#2) |
| C3 | Reception data area from off-system control apparatus 1 (#3) | ← | Reception data area from off-system control apparatus 1 (#3) | ← | Transmission data area of off-system control apparatus 1 (#3) | → | Reception data area from off-system control apparatus 1 (#3) |
| ... | ... | | ... | | ... | | ... |
| Cn | Reception data area from off-system control apparatus 1 (#n) | ← | Reception data area from off-system control apparatus 1 (#n) | ← | Reception data area from off-system control apparatus 1 (#n) | ← | Transmission data area of off-system control apparatus 1 (#n) |

F I G. 4

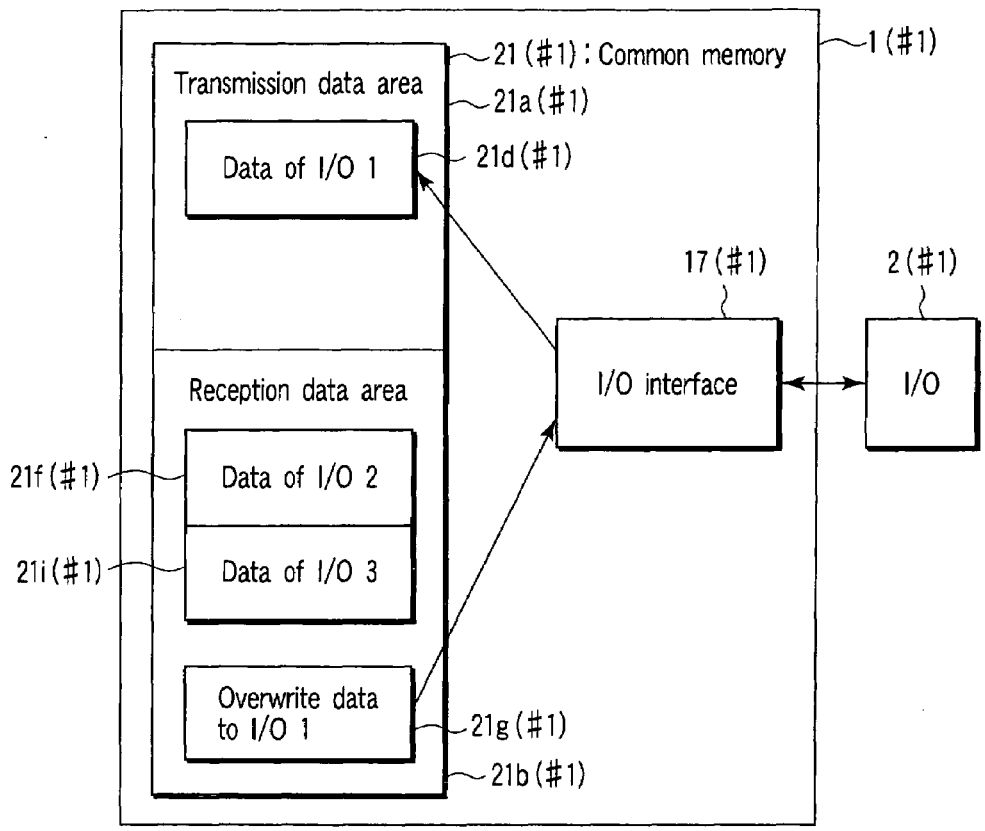
F I G. 11
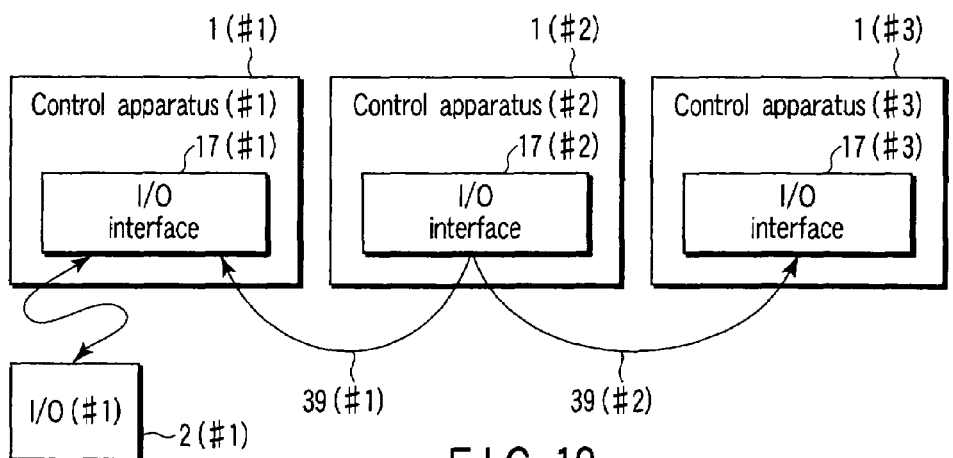
F I G. 12

CONTROL APPARATUS

CROSS-REFERENCE TO RELATED APPLICATIONS

This application is based upon and claims the benefit of priority from prior Japanese Patent Application No. 2004-284743, filed Sep. 29, 2004, the entire contents of which are incorporated herein by reference.

BACKGROUND OF THE INVENTION

1. Field of the Invention

The present invention relates to a control apparatus which is widely used to control an industrial system in, e.g., a factory automation field such as a steel, paper, or automobile plant, including assembly operations, a process automation field such as a chemical plant, or a public utility such as a water supply and drainage system, and, more particularly, to a control apparatus which can transmit data input/output to/from an I/O or a transmission apparatus, between the control apparatus and an off-system control apparatus at high speed.

2. Description of the Related Art

As shown in FIG. 1, a conventional control apparatus 40 includes a CPU 11, program memory 12, data memory 13, control program execution circuit 14, control program memory 15, control data memory 16, I/O interface 17, communication interface 18, data transmission circuit 20, and inter-module interface 24 which are connected to each other through a system bus 19.

The CPU 11 is a processor for totally managing the control apparatus 40. The program memory 12 stores a system program (operating system) and total management software used by the CPU 11. The data memory 13 stores data used in the system program (operating system) and total management software.

The control program execution circuit 14 is a dedicated circuit for executing an application program (control program) to use the control apparatus 40. The application program (control program) executed by the control program execution circuit 14 is stored in the control program memory 15. The control data memory 16 stores the data used when executing this application program (control program), and is used as a work area.

The I/O interface 17 is a circuit for adjusting data length and data access timing in order to connect to the system bus 19 an I/O 2 connected to a control target 30. Note that the I/O 2 is an apparatus for connecting the control target 30 to the control apparatus 40. The I/O 2 is used to input the state of the control target 30, and drive the control target 30.

The communication interface 18 is a circuit for adjusting data transfer speed and timing between the control apparatus 40 and an apparatus such as a monitor apparatus 3 connected by serial data transmission.

The data transmission circuit 20 is a circuit for efficiently performing data transfer by, e.g., changing, modulating, and demodulating a data signal voltage, in order to transmit the data between the control apparatus 40 and an off-system control apparatus 23 at high speed.

The inter-module interface 24 is connected to an inter-module connection bus 25 in addition to the system bus 19. The inter-module interface 24 is an interface for transmitting/receiving the data between the control apparatus 40 and an off-system module 26 which is also connected to the inter-module connection bus 25.

The above-described control apparatus 40 is connected to the off-system module 26 through the inter-module connection bus 25. For example, if the off-system module 26 is a transmission module, a control data memory for storing a variable used in this transmission module is different from the control data memory 16 for storing an I/O control variable.

Also, a memory area used to exchange data between the control apparatus 40 and the off-system control apparatus 23 through a transmission path 22 is different from the area of the control data memory 16.

Therefore, for example, when data from the I/O 2 used by the control apparatus 40 is to be transmitted to the off-system control apparatus 23, the I/O control variable needs to be copied into the control data memory 16 for storing the transmission module variable. In addition to this, the transmission module serving as one form of the off-system module 26 is generally independent of the control apparatus 40. Hence, the data needs to be transferred between the control apparatus 40 and the module 26, thus consuming data transfer time in addition to the transmission time.

However, in the above-described conventional control apparatus, the following problem occurs.

That is, in the above-described conventional control apparatus, overhead is increased when the control variable in one storage area is transferred to a different storage area of an off-system peripheral circuit and the module 26. As a result, the increase in control speed is prevented.

The present invention has been made in consideration of this case, and has as its object to provide a control apparatus which can integrally handle not only I/O data but also a memory area used by a transmission apparatus connected to the control apparatus itself, or a module having other functions, reduce the time required for copying the control variable, and increase the speed of the control operation.

BRIEF SUMMARY OF THE INVENTION

In order to achieve the above object, the present invention takes the following means.

That is, according to the present invention, there is provided a control apparatus which generates control information on the basis of control target information from a control target, controls the control target by using the generated control information, and transmits the control information to an off-system control apparatus, comprising a single memory area which stores both the control target information from the control target, and the control information to be transmitted.

Upon taking the above-described means, when the control target information is to be transferred from the control target to the off-system control apparatus, the control target information can be directly transferred from the memory area to the off-system control apparatus without temporally sending the information to a transfer data memory. Hence, the control target information can be commonly used by the off-system control apparatus at a high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining a conceptual example of scan transmission;

FIG. 11 is a conceptual view showing an example of a method of writing data from an off-system control apparatus into the common memory in a control apparatus;

FIG. 12 is a functional block diagram showing a connection example of a plurality of control apparatuses according to the sixth embodiment.

DETAILED DESCRIPTION OF THE INVENTION

Figure 1:
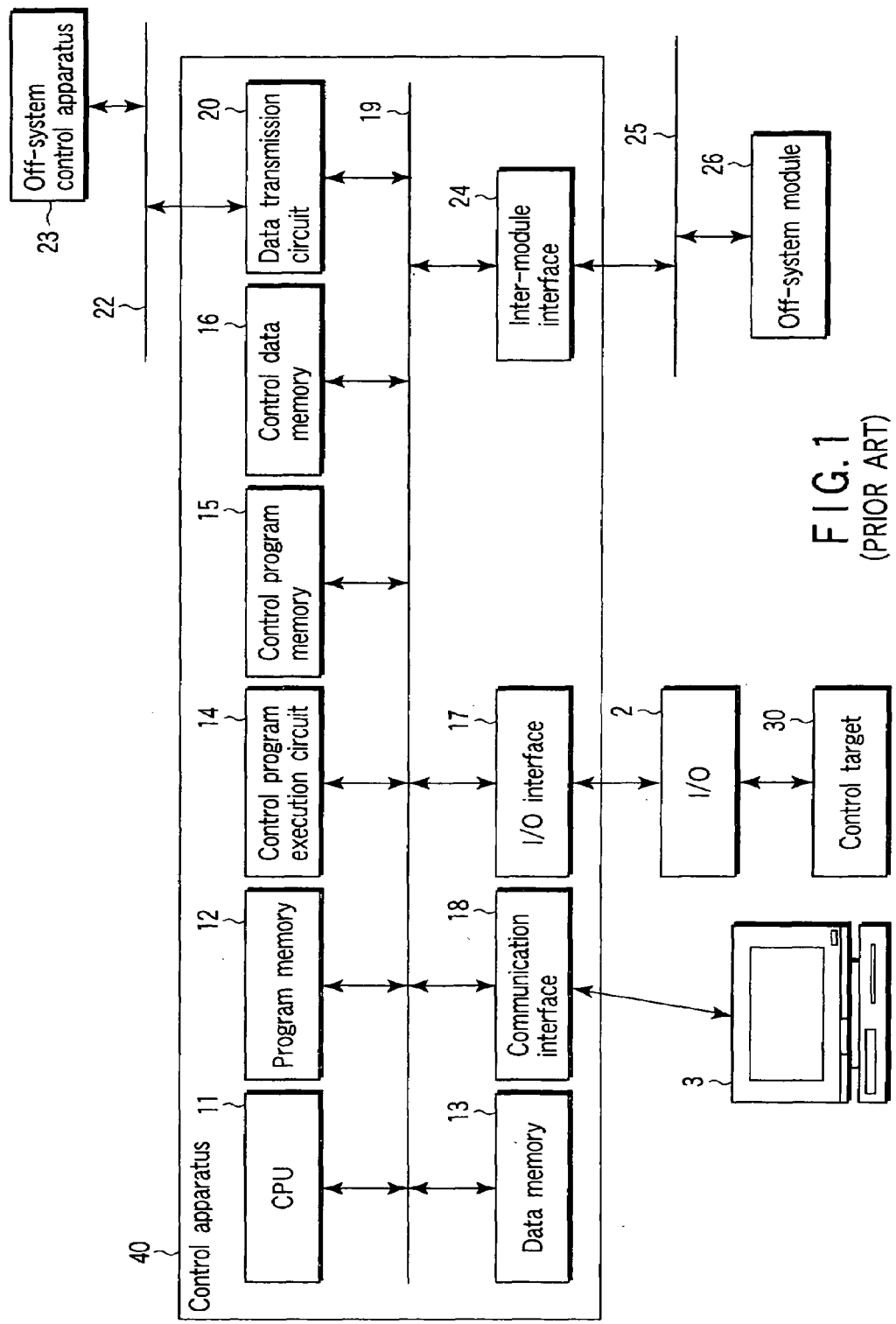
FIG. 1 is a functional block diagram showing an arrangement of a control apparatus in a prior art.

The most preferable embodiments of the present invention will be described below with reference to the drawing. Note that the same reference numerals in the embodiments denote the same parts as in FIG. 1 throughout the drawings.

FIRST EMBODIMENT

The first embodiment of the present invention will be described with reference to FIGS. 2 to 5.

Figure 2:
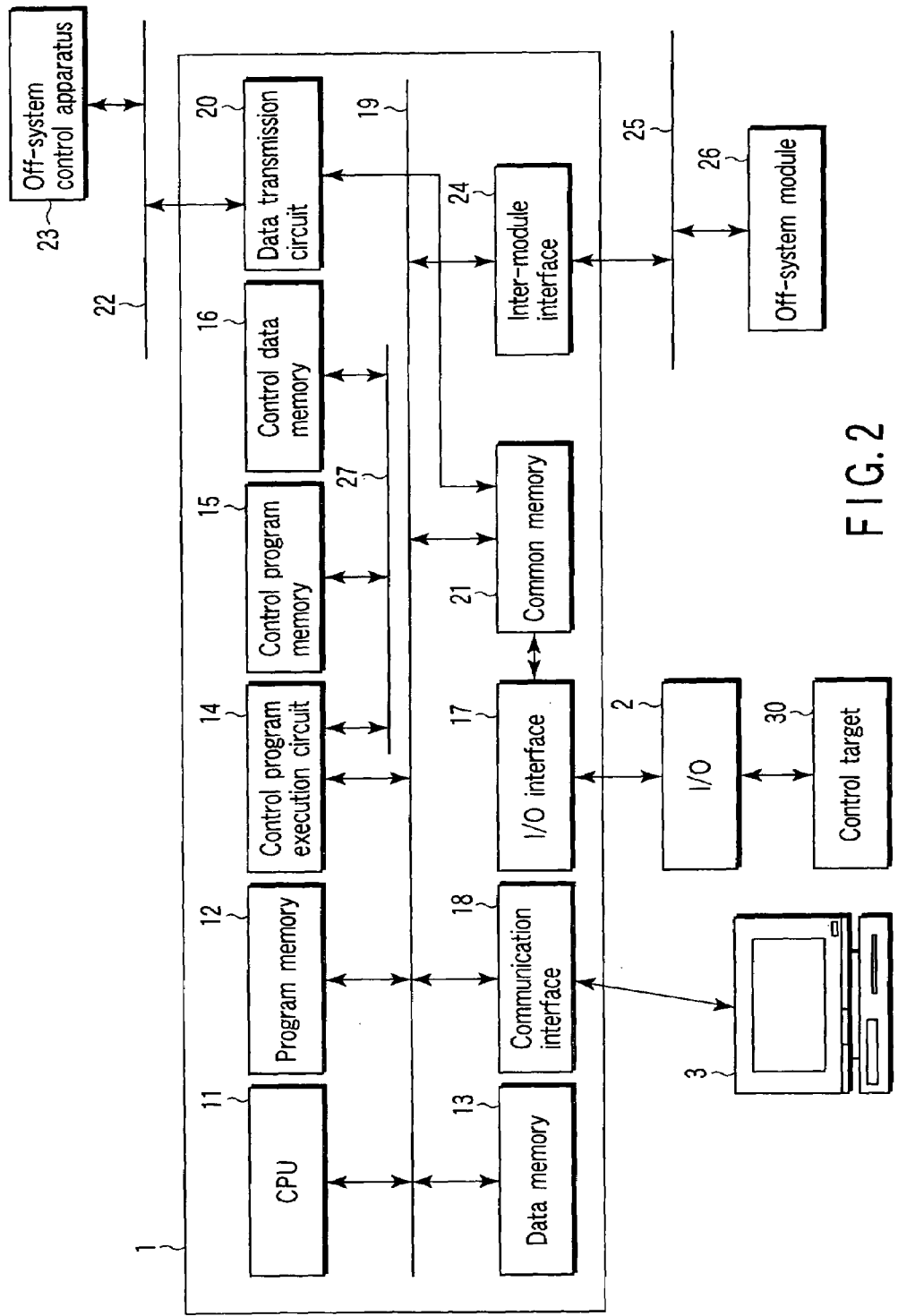
FIG. 2 is a functional block diagram showing an example of a control apparatus according to the first embodiment.

FIG. 2 is a functional block diagram showing an example of a control apparatus according to the first embodiment.

That is, according to the first embodiment, a control apparatus 1 is different from a control apparatus 40 in the prior art shown in FIG. 1 in that a common memory 21 is added, and a control program execution circuit 14, control program memory 15, and control data memory 16 are connected to each other through a dedicated bus 27. This common memory 21 is connected to an I/O interface 17, data transmission circuit 20, and system bus 19. Additionally, the control program execution circuit 14 includes an arithmetic circuit, bus control circuit, and work register.

Figure 3:
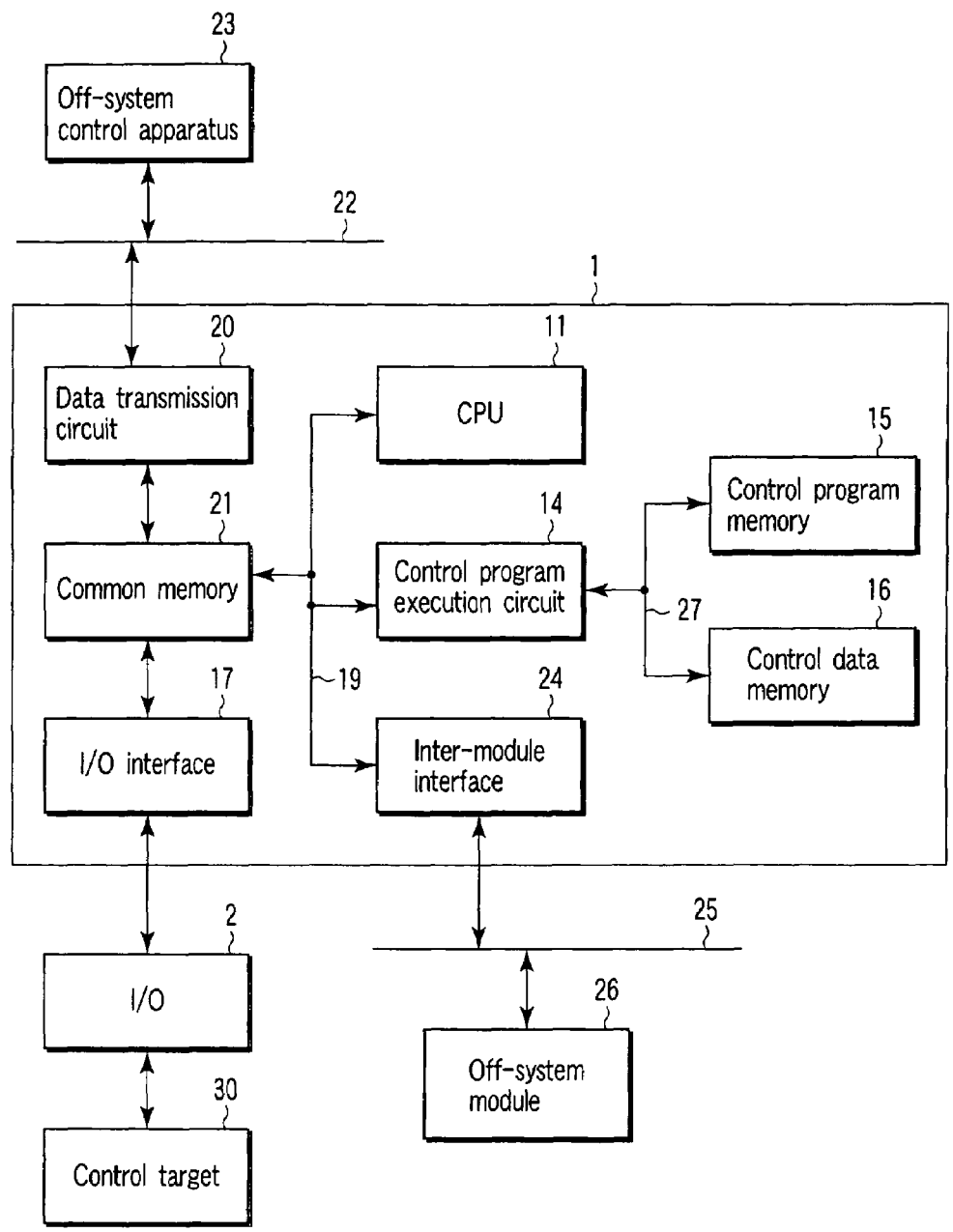
FIG. 3 is a functional block diagram showing a modification of the arrangement of the control apparatus in FIG. 2 with attention to I/O data transfer.

FIG. 3 is a block diagram showing a modified arrangement of the control apparatus 1 in FIG. 2 with attention to I/O data transfer. In FIG. 3, the common memory 21 is directly connected to the I/O interface 17 and the data transmission circuit 20. The common memory 21 is used as a common resource such as an I/O data buffer or transmission data buffer for each unit in the control apparatus 1.

The I/O interface 17 and the data transmission circuit 20 can operate independently of the CPU 11 and the control program execution circuit 14. The I/O interface 17 reads data of a control target 30 from the I/O 2, and outputs the control data to the control target 30.

The control program execution circuit 14 and the CPU 11 read the I/O data from the common memory 21, and write the control data to the common memory 21, thereby executing the control operation.

Similarly, the data transmission circuit 20 exchanges the transmission data between the common memory 21 and an off-system control apparatus 23 or the like to carry out the function as a network apparatus. The data transmission circuit 20 is also used for scan transmission (cyclic transmission) performed between the off-system control apparatus 23 and the control apparatus 1.

Hence, in the common memory 21, transmission and reception data areas respectively allocated to the control apparatus 1 and the off-system control apparatus 23 are arranged. In this arrangement, the data in the transmission data area of the control apparatus 1 is transferred, by one data transmission, to all of the common memories 21 in the off-system control apparatuses connected through a single transmission path.

The concept of the above-described scan transmission will be described with reference to FIG. 4. In FIG. 4, control apparatuses 1 (#1), 1 (#2), (#3), ..., 1 (#n) are connected to each other through the single transmission path. As shown in a line $C_1$, the data in the transmission data area of the control apparatus 1 (#1) is transferred, by one data transmission, to the common memories 21 of the control apparatus 1 (#2) and control apparatuses 1 (#3) to 1 (#n) all of which are connected to the single transmission path. Similarly, as shown in a line $C_2$, the data in the transmission data area of the control apparatus 1 (#2) is also transferred to the common memories 21 of the control apparatus 1 (#1) and control apparatuses 1 (#3) to 1 (#n). Similarly, as shown in a line $C_3$, the data in the transmission data area of the control apparatus 1 (#3) is also transferred to the common memories 21 of the control apparatuses 1 (#1) and 1 (#2), and control apparatuses 1 (#4) to 1 (#n). Similarly, as shown in a line Cn, the data in the transmission data area of the control apparatus 1 (#n) is also transferred to the common memories 21 of the control apparatuses 1 (#1) to 1 (#(n−1)).

Figure 5:
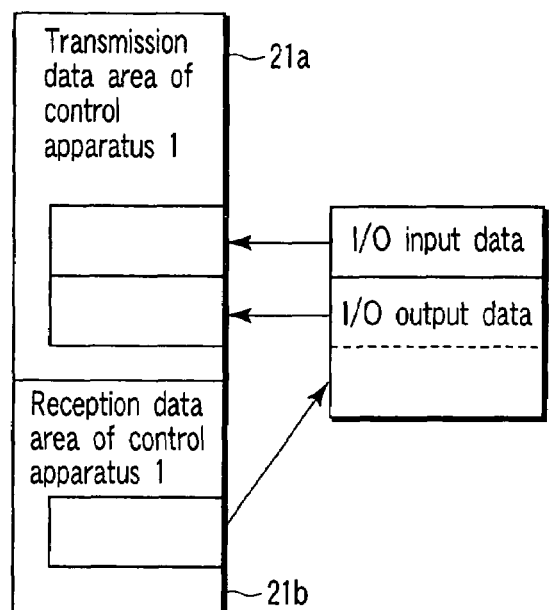
FIG. 5 is a conceptual view showing an example of the allocation of a transmission data area in a common memory.

FIG. 5 shows the concept of an example of the allocation of a transmission data area in the common memory 21. For example, when the data input/output to/from an I/O 2 is to be also used in the off-system control apparatus 23 via the control apparatus 1, allocation is a made such that transmission data area 21a allocated to the common memory 21 in the control apparatus 1 receives the data from the I/O 2. Hence, the data from the I/O 2 included in the control apparatus 1 can also be used in the off-system control apparatus 23. In this arrangement, when the data from the I/O 2 is to be transmitted to the off-system control apparatus 23, after reading the data from the I/O 2, the data need not be copied from the I/O data buffer to the control data memory 16 used by the data transmission circuit 20. Hence, the overhead of a CPU 11 and the control program execution circuit 14 in the control apparatus 1 can be reduced to execute the control within a short control period.

Next, the operation of the above-described control apparatus according to the first embodiment will be described.

In FIG. 3, the control apparatus 1 according to the first embodiment includes the common memory 21 directly connected to the I/O interface 17 and the data transmission circuit 20. The common memory 21 is used as a common resource such as the I/O data buffer or transmission data buffer for each unit in the control apparatus 1.

The I/O interface 17 and the data transmission circuit 20 can operate independently of the CPU 11 and the control program execution circuit 14. The I/O interface 17 reads data of a control target 30 from the I/O 2, and outputs the control data to the control target 30.

The control program execution circuit 14 and the CPU 11 read the I/O data from the common memory 21, and write the control data to the common memory 21, thereby executing the control operation.

Similarly, the data transmission circuit 20 exchanges the transmission data between the common memory 21 and an off-system control apparatus 23 or the like to serve as a network apparatus. The data transmission circuit 20 is also used for scan transmission (cyclic transmission) performed between the off-system control apparatus 23 and the control apparatus 1.

In order to implement this scan transmission, in the common memory 21, as shown in FIG. 5, the transmission data area 21a and a reception data area 21b respectively allocated to the control apparatus 1 and the off-system control apparatus 23 are arranged. In this arrangement, as shown in FIG. 4, the data in the transmission data area 21a of the control apparatus 1 is transferred, by one data transmission, to all of the reception data areas 21b of the common memories 21 in the off-system control apparatuses 1(#2 to #n) connected through a single transmission path.

With this operation, the data of the I/O 2 included in the control apparatus 1 can also be used in the off-system control apparatus 23. Alternatively, by using a data flow in the opposite direction, as shown in FIG. 5, the data transmitted from the off-system control apparatus 23 can be output to the I/O 2 included in the control apparatus 1.

As described above, in the control apparatus according to the first embodiment, when the data from the I/O 2 is to be transmitted to the off-system control apparatus 23, after reading the data from the I/O 2, the data need not be copied from the I/O data buffer to the control data memory 16 used by the data transmission circuit 20. Hence, the overhead of a CPU 11 and the control program execution circuit 14 in the control apparatus 1 can be reduced to execute the control within a short control period.

SECOND EMBODIMENT

Figure 6:
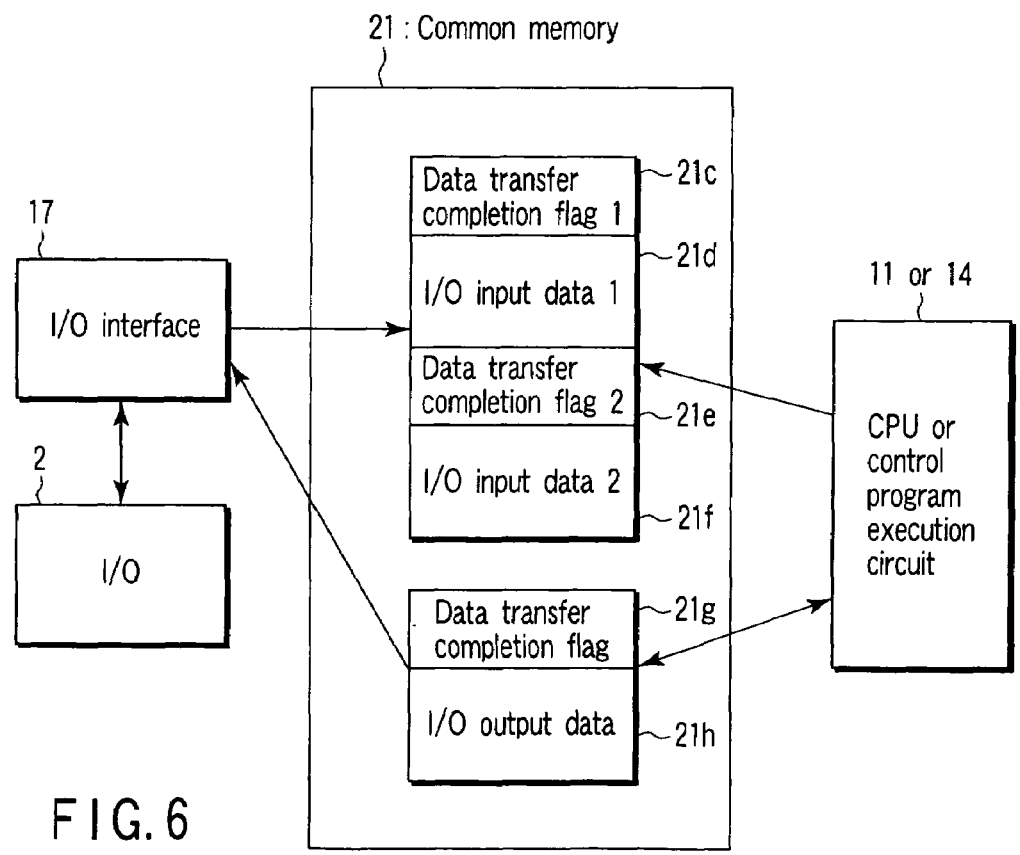
FIG. 6 is a conceptual view for explaining an example of an I/O data batch input/output method according to the second embodiment.

The second embodiment of the present invention will be described with reference to FIGS. 6 and 7. The same reference numerals as in the first embodiment denote the same parts in FIG. 6, and a repetitive description will be omitted.

In a control apparatus according to the second embodiment, data is autonomously input/output between an I/O interface 17 and a common memory 21. That is, as shown in FIG. 6, the I/O interface 17 writes I/O input data (e.g., I/O input data 1 21d) obtained from an I/O 2, to the common memory 21. The I/O interface 17 also obtains I/O output data (e.g., I/O output data 21h) from the common memory 21, and then writes the obtained data to the I/O 2.

Figure 7:
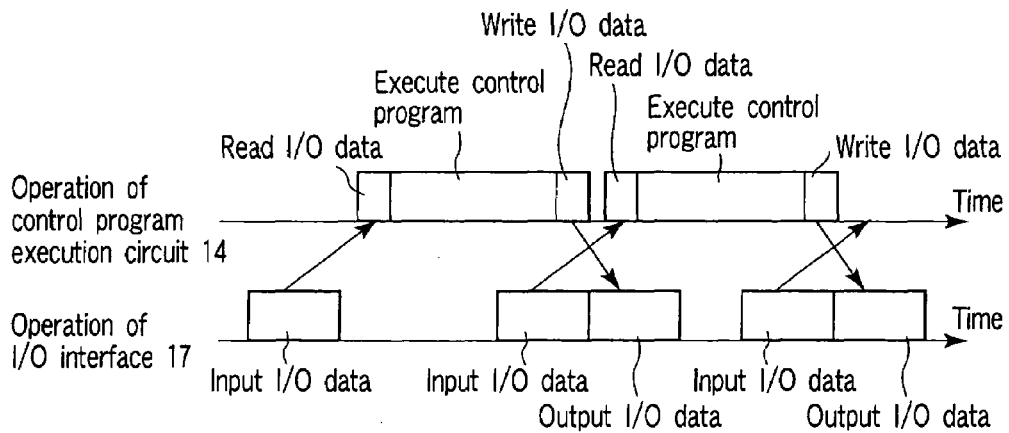
FIG. 7 shows an example of a timing chart of the operations of a control program execution circuit and an I/O interface.

Batch input/output operation performed by the I/O interface 17 is concurrently executed with the operation of the control program execution circuit 14, as shown in the timing chart of the operations of the control program execution circuit 14 and the I/O interface 17 in FIG. 7. Before starting scanning the control program, the control program execution circuit 14 prepares the I/O input data from the I/O 2, in the common memory 21. The flag or the like in FIG. 6 notifies the control program that the I/O input data can be used.

In the I/O input data from the I/O 2, the data is not used in the writing operation to the common memory 21, and a plurality of buffer areas and transfer completion flags (e.g., data transfer completion flag 1 21c and data transfer completion flag 2 21e) are provided such that a completely transferred data group can be used. Through the common memory 21 the I/O interface 17 is notified of information representing that the scan process of the control program execution circuit 14 ends and the I/O output data 21h is written in the common memory 21. After that, the I/O interface 17 outputs the I/O output data 21h to the I/O 2.

As described above, the I/O interface 17 performs a batch input/output process of the I/O data while handshaking with the control program execution circuit 14. Generally, the time required for inputting/outputting the data to/from the common memory 21 is shorter than that for inputting/outputting the I/O data, thereby shortening the effective scan time of the control program.

Next, the operation of the above-described control apparatus according to the second embodiment of the present invention will be described.

In a control apparatus according to the second embodiment, data is autonomously input/output between an I/O interface 17 and a common memory 21. Accordingly, as shown in FIG. 6, the I/O interface 17 writes I/O input data (e.g., I/O input data 1 21d) obtained from an I/O 2, to the common memory 21. The I/O interface 17 also writes the I/O output data (e.g., I/O output data 21h) from the common memory 21 to the I/O 2.

Batch input/output operation performed by the I/O interface 17 is concurrently executed with the operation of the control program execution circuit 14, as shown in the timing chart in FIG. 7. Before starting scanning the control program, the control program execution circuit 14 prepares the I/O input data from the I/O 2, in the common memory 21. The flag or the like in FIG. 6 notifies the control program that the I/O input data can be used.

In the I/O input data from the I/O 2, the data is not used in the writing operation to the common memory 21, and a plurality of buffer areas and transfer completion flags (e.g., data transfer completion flag 1 21c and data transfer completion flag 2 21e) are provided such that the completely transferred data group can be used. Through the common memory 21 the I/O interface 17 is notified of information representing that the scan process of the control program execution circuit 14 ends and the I/O output data 21h is written in the common memory 21. After that, the I/O interface 17 outputs the I/O output data 21h to the I/O 2.

As described above, in the control apparatus according to the second embodiment, the I/O interface 17 performs a batch input/output process of the I/O data while handshaking with the control program execution circuit 14. Generally, the time required for inputting/outputting the data to/from the common memory 21 is shorter than that for inputting/outputting the I/O data, thereby shortening the effective scan time of the control program.

THIRD EMBODIMENT

The third embodiment of the present invention will be described with reference to FIGS. 3, 8, and 9.

Figure 8:
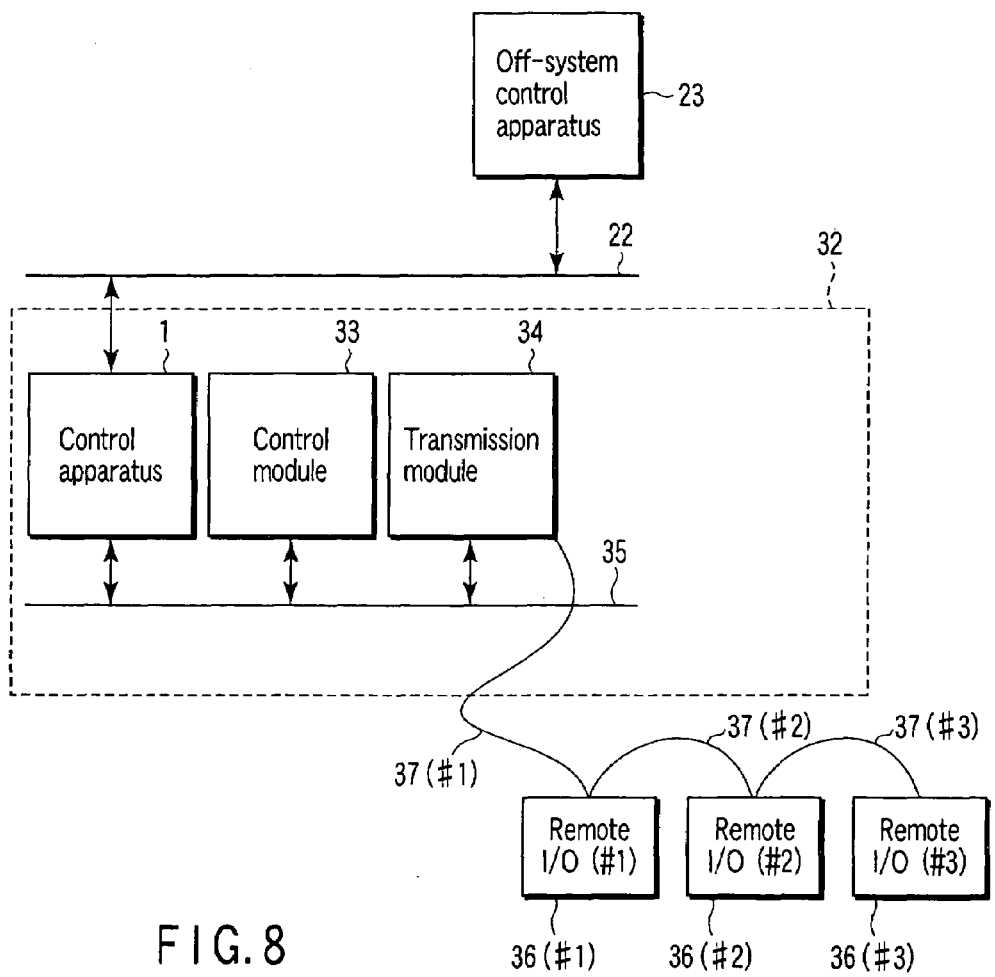
FIG. 8 is a functional block diagram showing an arrangement of a unit which mounts a control apparatus applied to the third embodiment.

In the third embodiment, as shown in FIG. 8, assume that a control apparatus 1 described in the first or second embodiment is mounted in a single unit 32 together with a control module 33 and a transmission module 34. Since the arrangement of the control apparatus 1 is the same as in the first and second embodiments, a repetitive description will be omitted.

Each of the control apparatus 1, control module 33, and transmission module 34 which are mounted in the unit 32 is connected to a inter-module bus 35 so that data transfer can be performed through the inter-module bus 35. Therefore, in the control apparatus 1, a CPU 11 uses an inter-module interface 24 to read data such as a global variable from the control module 33 or the transmission module 34 through the inter-module bus 35. The read data are written in a common memory 21.

Figure 9:
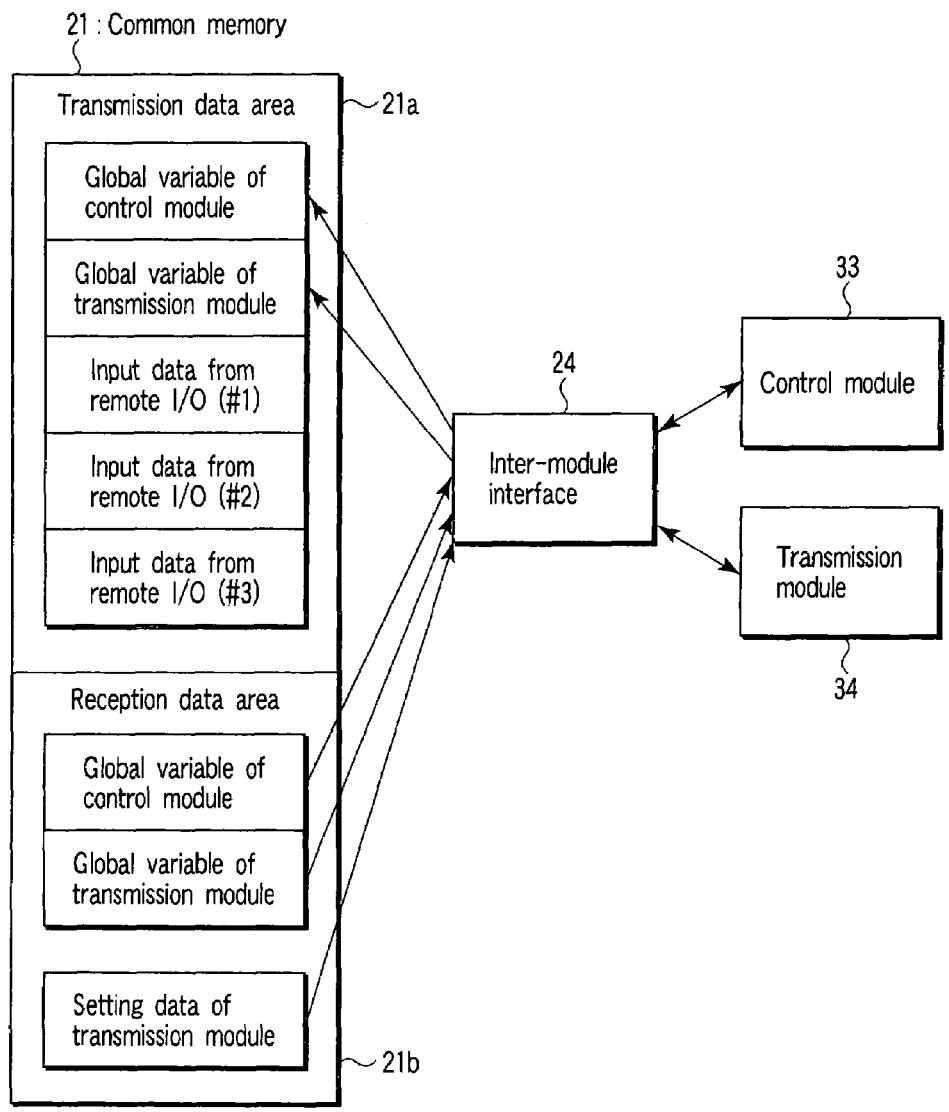
FIG. 9 is a conceptual view for explaining an example of the state wherein data from a control module and a transmission module are allocated to a common memory in the control apparatus.

As shown in FIG. 9, these data are written in a transmission data area 21a in the common memory 21. As described in the first embodiment, the contents of the common memory 21 are equalized with those of the common memory 21 in an off-system control apparatus 23 through a data transmission circuit 20. Therefore, in this arrangement, the control apparatus 1 can access the data in the control module 33 and the transmission module 34 serving as the off-system modules mounted in the same single unit 32 as in the control apparatus 1. Similarly, the control module 33 and the transmission module 34 can also access the data (e.g., the global variables of the control module 33 and the transmission module 34, and the setting data of the transmission module 34) written in a reception data area 21b in the common memory 21.

Next, the operation of the above-described control apparatus according to the third embodiment will be described.

Each of the control apparatus 1, control module 33, and transmission module 34 which are mounted in the unit 32 is connected to a inter-module bus 35 so that data transfer can be performed through the inter-module bus 35. Therefore, the inter-module interface 24 of the control apparatus 1 reads data such as a global variable from the control module 33 or the transmission module 34, and the read data is written in the transmission data area 21a in the common memory 21, as shown in FIG. 9.

As described above, in the control apparatus according to the third embodiment, the control apparatus 1 can access the data in the control module 33 and the transmission module 34 serving as the off-system modules mounted in the same single unit 32 as in the control apparatus 1. Similarly, the control module 33 and the transmission module 34 can also access the data (e.g., the global variables of the control module 33 and the transmission module 34, and the setting data of the transmission module 34) written in a reception data area 21b in the common memory 21.

FOURTH EMBODIMENT

The fourth embodiment of the present invention will be described with reference to FIGS. 8 and 9.

In a control apparatus according to the fourth embodiment, as shown in FIG. 8, assume that a control apparatus 1 as in the first or second embodiment is also mounted in a single unit 32 together with a control module 33 and a transmission module 34, as in a control apparatus according to the third embodiment. Therefore, in the fourth embodiment, the points different from the third embodiment will be described, and a repetitive description will be omitted.

That is, the fourth embodiment shows a more practical example of the third embodiment. As shown in FIG. 8, assume that the transmission module 34 mounted in the single unit 32 includes a transmission common memory (not shown), like a Profibus (trademark) module and DeviceNet (trademark) module. When all the contents of this transmission common memory (not shown) are copied into a common memory 21 in a control apparatus 1, data from a module arranged downstream of the control apparatus 1 can be used through an off-system control apparatus 23.

In an example shown in FIG. 8, the transmission module 34 is also connected to a remote I/O 36 (#1) through a transmission path 37 (#1). The remote I/O 36 (#1) is connected to the remote I/O 36 (#2) through the transmission path 37 (#2), and then connected to the remote I/O 36 (#3) through the transmission path 37 (#3).

In this case, as shown in FIG. 9, all input data from the remote I/Os 36 (#1 to #3) connected to the transmission module 34 are allocated to a transmission data area 21a of the common memory 21 in the control apparatus 1. Therefore, the off-system control apparatus 23 connected to a data transmission circuit 20 in the control apparatus 1 can access the data of all the modules (e.g., the control module 33 and transmission module 34) and the apparatuses (e.g., the remote I/Os 36 (#1 to #3)) connected downstream of the control apparatus 1, in addition to the input data from the remote I/Os 36 (#1 to #3). This operation is particularly useful when the data transmission circuit 20 is connected to a monitor apparatus and a surveillance apparatus.

Next, the operation of the above-described control apparatus according to the fourth embodiment will be described.

That is, as shown in FIG. 8, assume that the transmission module 34 mounted in the single unit 32 together with the control apparatus 1 according to the fourth embodiment includes the transmission common memory (not shown), like the Profibus (trademark) module and DeviceNet (trademark) module. When all the contents of this transmission common memory (not shown) are copied into the common memory 21 in the control apparatus 1, data from the module arranged downstream of the control apparatus 1 can be used through the off-system control apparatus 23.

More specifically, when the remote I/Os 36 (#1 to #3) are sequentially connected downstream of the transmission module 34, as shown in FIG. 8, the input data from the remote I/Os 36 (#1 to #3) are allocated to the transmission data area 21a of the common memory 21 in the control apparatus 1 as shown in FIG. 9.

Therefore, the off-system control apparatus 23 connected to the data transmission circuit 20 in the control apparatus 1 can access the data of all the modules (e.g., the control module 33 and transmission module 34) and the apparatuses (e.g., the remote I/Os 36 (#1 to #3)) connected downstream of the control apparatus 1, in addition to the input data from the remote I/Os 36 (#1 to #3). This operation is particularly useful when the data transmission circuit 20 is connected to a monitor apparatus and a surveillance apparatus.

FIFTH EMBODIMENT

The fifth embodiment will be described with reference to FIGS. 10 and 11.

Figure 10:
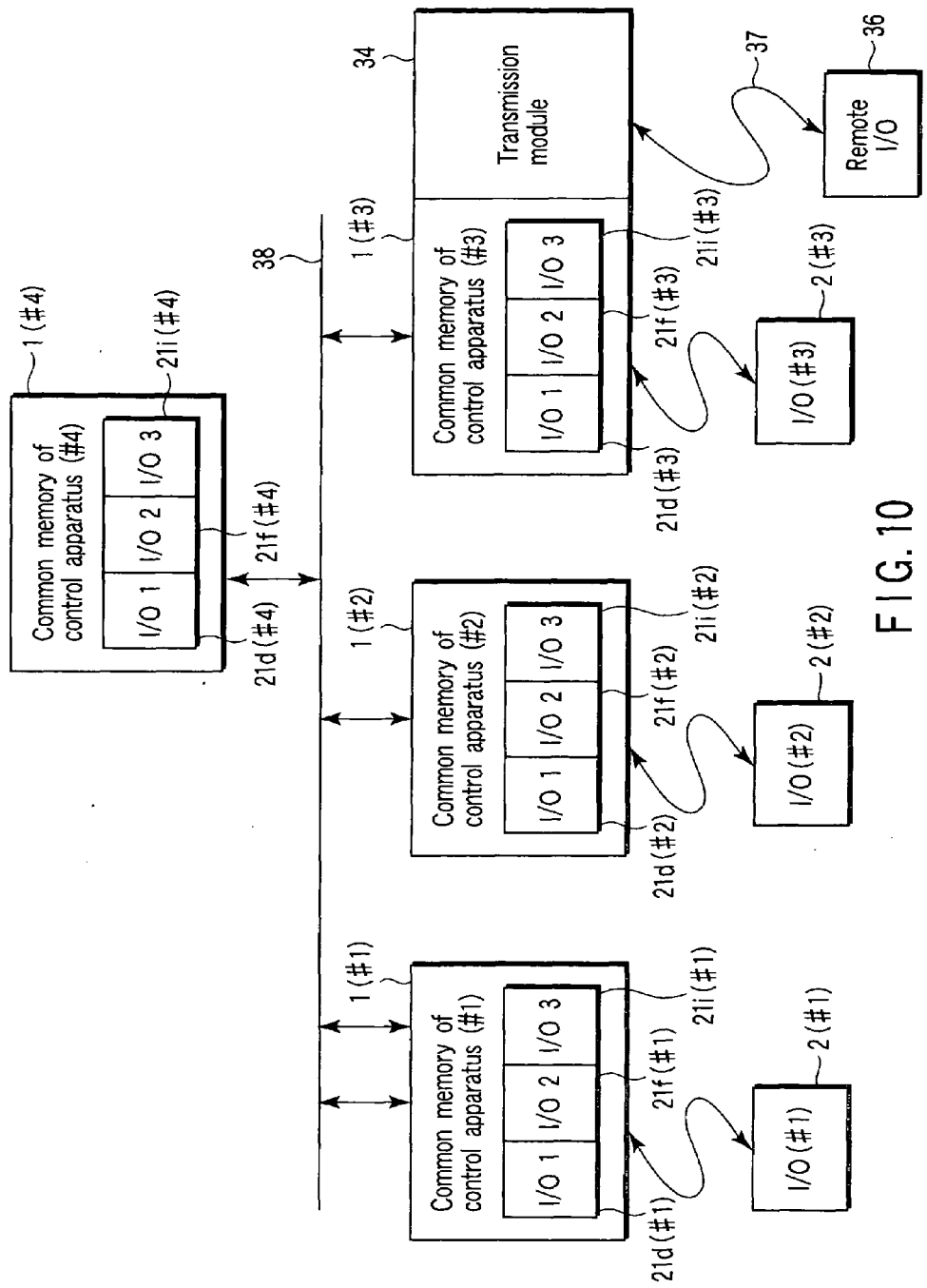
FIG. 10 is a functional block diagram showing a connection example of a plurality of control apparatuses according to the fifth embodiment.

In the fifth embodiment, as shown in FIG. 10, a plurality of control apparatuses 1 (e.g., control apparatuses 1 (#1 to #4)) described in the first or second embodiment are connected to each other through a transmission path 38 so that data can be transmitted/received to/from each other. The arrangement of the control apparatus 1 is the same as in the first and second embodiments, a repetitive description will be omitted.

Note that, as shown in FIG. 10, the control apparatuses 1 (#1 to #3) are respectively connected to dedicated I/Os 2 (#1 to #3) through I/O interfaces 17 (see FIG. 2). Hence, as described in the first and second embodiments, since each of the control apparatuses 1 has an I/O data area in a common memory 21, data transfer can be performed between the control apparatus 1 and the corresponding I/O 2. That is, since the common memory 21 (#1) of the control apparatus 1 (#1) has an I/O data area 21d (#1) for storing the I/O data from the I/O 2 (#1), I/O data transfer can be performed between the control apparatus 1 (#1) and the I/O 2 (#1). Also, since the common memory 21 (#2) of the control apparatus 1 (#2) has an I/O data area 21f (#2) for storing the I/O data from the I/O 2 (#2), I/O data transfer can be performed between the control apparatus 1 (#2) and the I/O 2 (#2). Also, since the common memory 21 (#3) of the control apparatus 1 (#3) has an I/O data area 21i (#3) for storing the I/O data from the I/O 2 (#3), I/O data transfer can be performed between the control apparatus 1 (#3) and the I/O 2 (#3).

Note that since the control apparatuses 1 (#1 to #4) are connected to each other through the transmission path 38 in the state wherein the data can be transmitted/received to/from each other, a given control apparatus 1 can obtain the I/O data in the I/O data area of the common memory 21 in an off-system control apparatus 1.

Therefore, since the common memory 21 (#1) of the control apparatus 1 (#1) has the I/O data area 21f (#1) for storing the I/O data from the I/O data area 21f (#2) of the control apparatus 1 (#2), I/O data transfer can be performed between the control apparatus 1 (#2) and the control apparatus 1 (#1). Also, since the common memory 21 (#1) of the control apparatus 1 (#1) has the I/O data area 21i (#1) for storing the I/O data from the I/O data area 21i (#3) of the control apparatus 1 (#3), I/O data transfer can be performed between the control apparatus 1 (#3) and the control apparatus 1 (#1). In this arrangement, the control apparatus 1 (#1) can transfer the I/O data not only between the control apparatus 1 (#1) and the I/O 2 (#1) directly connected to the control apparatus 1 (#1) itself, but also between the control apparatus 1 (#1) and the I/Os 2 (#2 and #3) respectively connected to the off-system control apparatuses 1 (#2 and #3).

Similarly, since the common memory 21 (#2) of the control apparatus 1 (#2) has the I/O data area 21d (#2). for storing the I/O data from the I/O data area 21d (#1) of the control apparatus 1 (#1), I/O data transfer can be performed between the control apparatus 1 (#1) and the control apparatus 1 (#2). Also, since the common memory 21 (#2) of the control apparatus 1 (#2) has the I/O data area 21i (#2) for storing the I/O data from the I/O data area 21i (#3) of the control apparatus 1 (#3), I/O data transfer can be performed between the control apparatus 1 (#3) and the control apparatus 1 (#2). In this arrangement, the control apparatus 1 (#2) can transfer the I/O data not only between the control apparatus 1 (#2) and the I/O 2 (#2) directly connected to the control apparatus 1 (#2) itself, but also between the control apparatus 1 (#2) and the I/Os 2 (#1 and #3) respectively connected to the off-system control apparatuses 1 (#1 and #3).

Similarly, since the common memory 21 (#3) of the control apparatus 1 (#3) has the I/O data area 21d (#3) for storing the I/O data from the I/O data area 21d (#1) of the control apparatus 1 (#1), I/O data transfer can be performed between the control apparatus 1 (#1) and the control apparatus 1 (#3). Also, since the common memory 21 (#3) of the control apparatus 1 (#3) has the I/O data area 21f (#3) for storing the I/O data from the I/O data area 21f (#2) of the control apparatus 1 (#2), I/O data transfer can be performed between the control apparatus 1 (#2) and the control apparatus 1 (#3). In this arrangement, the control apparatus 1 (#3) can transfer the I/O data not only between the control apparatus 1 (#3) and the I/O 2 (#3) directly connected to the control apparatus 1 (#3) itself, but also between the control apparatus 1 (#3) and the I/Os 2 (#1 and #2) respectively connected to the off-system control apparatuses 1 (#1 and #2).

Furthermore, since the common memory 21 (#4) of the control apparatus 1 (#4) has the I/O data area 21d (#4) for storing the I/O data from the I/O data area 21d (#1) of the control apparatus 1 (#1), I/O data transfer can be performed between the control apparatus 1 (#1) and the control apparatus 1 (#4). Also, since the common memory 21 (#4) of the control apparatus 1 (#4) has the I/O data area 21f (#4) for storing the I/O data from the I/O data area 21f (#2) of the control apparatus 1 (#2), I/O data transfer can be performed between the control apparatus 1 (#2) and the control apparatus 1 (#4). Since the common memory 21 (#4) of the control apparatus 1 (#4) has the I/O data area 21i (#4) for storing the I/O data from the I/O data area 21i (#3) of the control apparatus 1 (#3), I/O data transfer can be performed between the control apparatus 1 (#3) and the control apparatus 1 (#4). In this arrangement, the control apparatus 1 (#4) can transfer the I/O data to/from the I/Os 2 (#1, #2, and #3) respectively connected to the off-system control apparatuses 1 (#1, #2, and #3), although the I/O 2 (#1) is not directly connected to the control apparatus 1 (#4) itself.

Note that although a detailed description will be omitted, when the control apparatus 1 (#3) includes a transmission module 34 connected to a remote I/O 36 through a transmission path 37, the control apparatus 1 (#3) can obtain I/O data from the remote I/O 36 by using the transmission module 34. Hence, when the common memory 21 of each of the control apparatuses 1 (#1 to #4) has the data area for storing the I/O data from the remote I/O 36, I/O data transfer can be performed between the control apparatus 1 (#1, #2, or #4) and the remote I/O 36 connected to the transmission module 34 of the control apparatus 1 (#3), even when the control apparatus 1 (#1, #2, or #4) has no transmission module 34.

As described above, since the control apparatuses 1 according to the first or second embodiment are connected to each other through the transmission path 38 in the state wherein the data can be transmitted/received to/from each other, an arbitrary control apparatus 1 connected to the transmission path 38 can access the data of the dedicated I/O 2 or remote I/O 36 of the off-system control apparatus 1.

More particularly, this characteristic is useful when one of the plurality of control apparatuses 1 (#1 to #4) connected to the transmission path 38 is applied as a surveillance apparatus. That is, when one control apparatus 1 having the above-described function serves as a surveillance apparatus, this surveillance apparatus can access the I/O data of all the control apparatuses 1. Accordingly, the data can be monitored without using any special software for collecting monitoring I/O data.

By using this function, the I/O data can be not only monitored, but also written from one control apparatus 1 to the common memory 21 in an off-system control apparatus 1. This operation will be described with reference to FIG. 11.

That is, in order to write the data from one control apparatus 1 (#1) to the common memory 21 of each of the alien control apparatuses 1 (#2 to #4), as shown in FIG. 11, a data overwrite area 21g (#1) may be provided in a reception data area 21b (#1) of the control apparatus 1 (#1). After writing the data in this area, the written data may be output to the I/O 2 (#1) through the I/O interface 17 (#1). With this operation, when the written data is obtained in the I/O 2 (#1), as described above, the data from the I/O 2 (#1) is obtained in the common memories 21 (#2 to #4) of the off-system control apparatuses 1 (#2 to #4).

SIXTH EMBODIMENT

Figure 13:
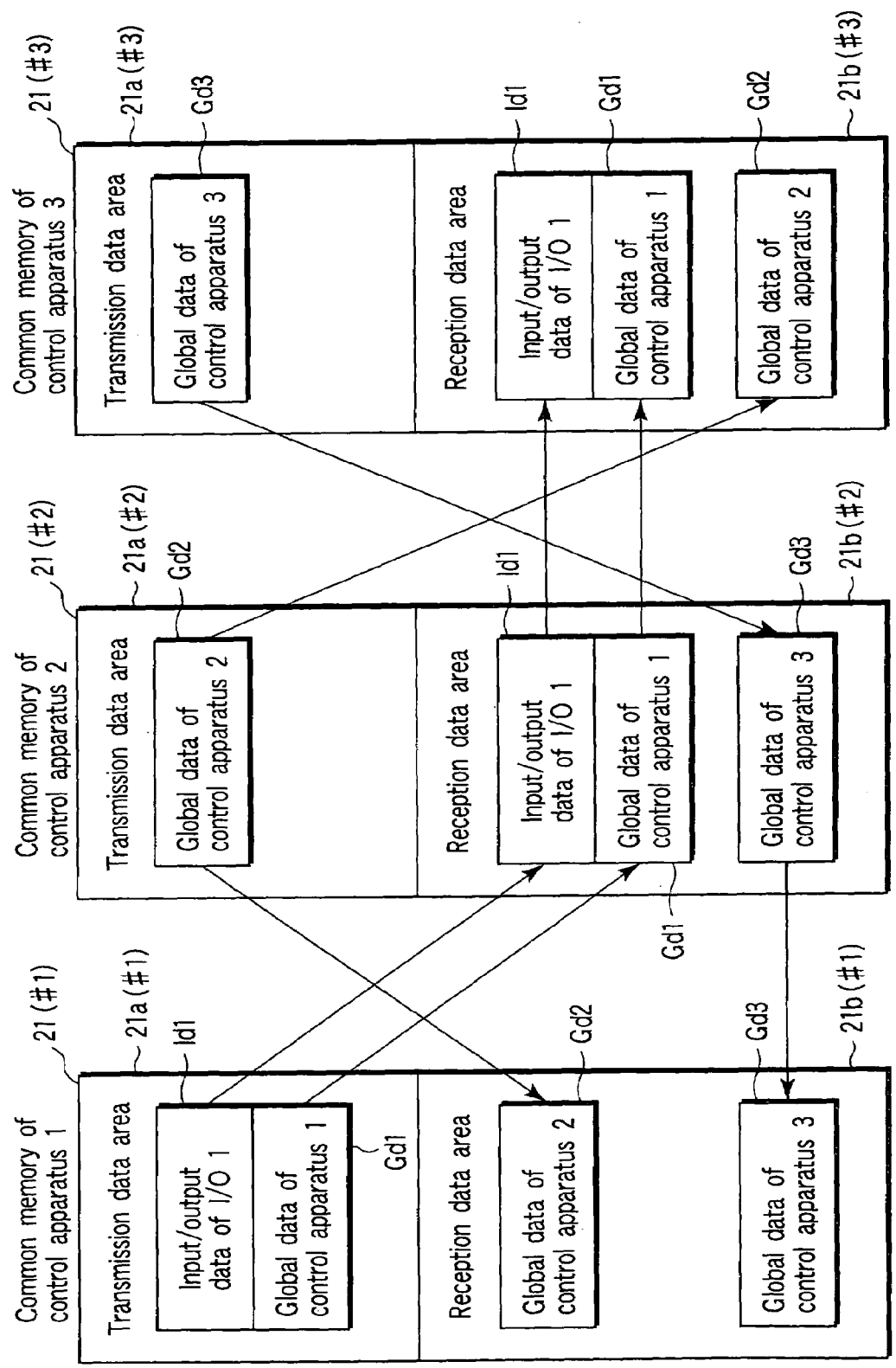
FIG. 13 is a conceptual view for explaining an example of a method of exchanging data between the plurality of control apparatuses according to the sixth embodiment.

The sixth embodiment of the present invention will be described with reference to FIGS. 12 and 13.

In the sixth embodiment, as shown in FIG. 12, a plurality of control apparatuses 1 (e.g., control apparatuses 1. (#1 to #3)) described in the first or second embodiment are connected to each other in series through transmission paths 39. That is, the control apparatus 1 (#1) is connected to the control apparatus 1 (#2) to connect I/O interfaces 17 (#1 and #2) through the transmission path 39 (#1) such that the data can be transmitted/received to/from each other. Also, the control apparatus 1 (#2) is connected to the control apparatus 1 (#3) to connect I/O interfaces (#2 and #3) through the transmission path 39 (#2) such that the data can be transmitted/received to/from each other. The I/O interface 17 (#1) of the control apparatus 1 (#1) is also connected to an I/O 2 (#2) such that the data can be transmitted/received to/from each other. Note that the arrangement of the control apparatus 1 is the same as in the first and second embodiments, and a repetitive description will be omitted.

That is, in the sixth embodiment, since the plurality of control apparatuses 1 (#1 to #3) are connected in series as described above, the I/O data can be simply transferred between the control apparatuses 1 (#1 to #3). The arrangement of common memories 21 (#1 to #3) of the control apparatuses 1 (#1 to #3) for performing this I/O data transfer is shown in FIG. 13.

In the arrangement shown in FIG. 12, only the control apparatus 1 (#1) includes the I/O 2 (#1). Therefore, the control apparatus 1 (#1) obtains I/O input/output data Id1 from the I/O 2 (#1) through the I/O interface 17 (#1), and stores the obtained data in a transmission data area 21a (#1) of the common memory 21 (#1). The control apparatus 1 (#1) stores its own global data Gd1 in the transmission data area 21a (#1) of the common memory 21 (#1).

As described above, the I/O input/output data Id1 and global data Gd1 stored in the transmission data area 21a (#1) of the common memory 21 (#1) are transmitted from the I/O interface 17 (#1) to the I/O interface 17 (#2) of the control apparatus 1 (#2) through the transmission path 39 (#1), and stored in a reception data area 21b (#2) of the common memory 21 (#2) in the control apparatus 1 (#2). Accordingly, the I/O input/output data Id1 and global data Gd1 stored in the reception data area 21b (#2) of the common memory 21 (#2) are transmitted from the I/O interface 17 (#2) to the I/O interface 17 (#3) of the control apparatus 1 (#3) through the transmission path 39 (#2), and also stored in the reception data area 21b (#3) of the common memory 21 (#3) in the control apparatus 1 (#3).

Also, the control apparatus 1 (#2) stores its own global data Gd2 in the transmission data area 21a (#2) of the common memory 21 (#2). As described above, the global data Gd2 stored in the transmission data area 21a (#2) is transmitted from the I/O interface 17 (#2) to the I/O interface 17 (#1) of the control apparatus 1 (#1) through the transmission path 39 (#1), and stored in a reception data area 21b (#1) of the common memory 21 (#1) in the control apparatus 1 (#1). Accordingly, the global data Gd2 is transmitted from the I/O interface 17 (#2) to the I/O interface 17 (#3) of the control apparatus 1 (#3) through the transmission path 39 (#2), and also stored in the reception data area 21b (#3) of the common memory 21 (#3) in the control apparatus 1 (#3).

Also, the control apparatus 1 (#3) stores its own global data Gd3 in the transmission data area 21a (#3) of the common memory 21 (#3). As described above, the global data Gd3 stored in the transmission data area 21a (#3) is transmitted from the I/O interface 17 (#3) to the I/O interface 17 (#2) of the control apparatus 1 (#2) through the transmission path 39 (#2), and stored in a reception data area 21b (#2) of the common memory 21 (#2) in the control apparatus 1 (#2). Accordingly, the global data Gd3 stored in the reception data area 21b (#2) of the common memory 21 (#2) is transmitted from the I/O interface 17 (#2) to the I/O interface 17 (#1) of the control apparatus 1 (#1) through the transmission path 39 (#1), and also stored in the reception data area 21b (#1) of the common memory 21 (#1) in the control apparatus 1 (#1).

As described above, when the plurality of control apparatuses 1 (#1 to #3) according to the first or second embodiment are connected in series through the transmission paths 39 such that the data can be transmitted/received to/from each other, the control apparatuses 1 (#1 to #3) use the common memories 21 (#1 to #3) as batch input/output data areas for storing the I/O input/output data. In addition to this, the common memories 21 (#1 to #3) can be used as data transmission memory areas for executing data transmission between the control apparatuses 1 (#1 to #3).

As described above, the general overhead of data transmission between the data transmission memory and the I/O input/output data memory can be reduced in the control apparatus 1 to perform the data transmission at high speed. In addition to this, since the plurality of control apparatuses 1 (#1 to #3) are connected in series through the transmission paths 39 (#1 and #2), data transmission can be performed between the control apparatuses in a control system which is so small that the transmission circuit cannot be used in the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus comprising:
   a data input/output unit;
   a program execution unit;
   a data transmission unit;
   a common memory; and
   a CPU,
   wherein:
   the common memory includes a storing area and three ports which can be accessed by the data input/output unit, the program execution unit, the CPU, and the data transmission unit, the storing area including a transmission data area and a received data area which store global variables accessible by control module, the global variables being transmitted and received by the data transmission unit, and an input local data area and an output local data area which store local variables accessed by the data input/output unit, the program execution unit and the CPU;
   the data input/output unit is operable independently of the CPU and the program execution unit to acquire control target information from a control target for the control apparatus, to store the acquired control target information in the input local data area of the common memory, and to output, to the control target, output control information stored in the output local data area of the common memory;

the program execution unit is operable independently of the data input/output unit and the data transmission unit to execute a control program for controlling the control target to generate output control information for the control target, using the control target information stored in the input local data area of the common memory, and to store the generated output control information in the transmission data area included in the common memory;

the data transmission unit is operable independently of the CPU and the program execution unit to transmit, to another control apparatus, the output control information stored in the transmission data area included in the common memory, to receive control information from said another control apparatus, and to store the received control information in a received data area included in the common memory and corresponding to said another control apparatus;

the CPU reads the control target information from the input local data area of the common memory and stores the control target information in the output local data area of the common memory.

2. An apparatus according to claim 1, further comprising:

an information obtaining unit which, when the control apparatus is connected to a device configured to hold or obtain the control target information, obtains the control target information held or obtained by the device, and stores the obtained control target information in the input local data area of the common memory.

3. An apparatus according to claim 1, further comprising:

an equalization unit which equalizes the output control information stored in the transmission data area of the common memory and the output control information stored in said another control apparatus.

* * * * *